(12) United States Patent
Kitabayashi et al.

(10) Patent No.: US 11,675,420 B2
(45) Date of Patent: Jun. 13, 2023

(54) METHOD FOR OPERATING DISPLAY APPARATUS, AND DISPLAY APPARATUS

(71) Applicant: SEIKO EPSON CORPORATION, Tokyo (JP)

(72) Inventors: Kazuyoshi Kitabayashi, Azumino (JP); Eisuke Sakamoto, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/506,079

(22) Filed: Oct. 20, 2021

(65) Prior Publication Data

US 2022/0121271 A1 Apr. 21, 2022

(30) Foreign Application Priority Data

Oct. 21, 2020 (JP) .............................. JP2020-176622

(51) Int. Cl.
*G06F 3/01* (2006.01)
(52) U.S. Cl.
CPC .................................... *G06F 3/011* (2013.01)
(58) Field of Classification Search
None
See application file for complete search history.

(56) References Cited

U.S. PATENT DOCUMENTS

| 2010/0271067 | A1  | 10/2010 | Cauli et al. |
| 2015/0324005 | A1* | 11/2015 | Kobayashi ............... G06F 3/01 345/173 |
| 2018/0052055 | A1  | 2/2018  | Ikeda et al. |

FOREIGN PATENT DOCUMENTS

| CN | 107430029 A | 12/2017 |
| JP | H05-14145 A | 1/1993 |
| JP | H09-42993 A | 2/1997 |
| JP | 2011-19212 A | 1/2011 |

* cited by examiner

*Primary Examiner* — Aneeta Yodichkas
(74) *Attorney, Agent, or Firm* — Oliff PLC

(57) ABSTRACT

A method for operating a display apparatus, the method including, detecting a first change in a first sensor signal from a first sensor, performing a first action in response to the detection of the first change, detecting changes in the first sensor signal in a first period that starts in response to the detection of the first change, maintaining the first action during the first period, and performing a second action after the first period if a second change in the first sensor signal last detected in the first period among the changes in the first sensor signal is different from the first change.

8 Claims, 9 Drawing Sheets

FIG. 14

| SETTING OF GPI TERMINAL 32a2 | 35a2 |
|---|---|
| L→H   IMAGE PROJECTION | m3 |
| FAVORITE PLAYLIST: 1 | r1 |
| INPUT SOURCE | r2 |
| EXECUTION CONDITION: GPI TERMINAL 32a3: L | m5 |
| SUSTAINED PERIOD: 5 SECONDS | m6 |
| H→L   IMAGE TERMINATION | m4 |
| FAVORITE PLAYLIST: 1 | r1 |
| INPUT SOURCE | r2 |
| EXECUTION CONDITION: GPI TERMINAL 32a3: L | m5 |
| SUSTAINED PERIOD: 30 SECONDS | m6 |

- ○ OFF
- ○ POWER ON
- ○ POWER OFF
- ○ AV MUTING
- ○ AV UNMUTING
- ● IMAGE PROJECTION
- ○ IMAGE TERMINATION
- ○ SOURCE SWITCHING
- ○ LIGHT SOURCE MODE [NORMAL]
- ○ LIGHT SOURCE MODE [LOW LUMINANCE]

METHOD FOR OPERATING DISPLAY APPARATUS, AND DISPLAY APPARATUS

The present application is based on, and claims priority from JP Application Serial Number 2020-176622, filed Oct. 21, 2020, the disclosure of which is hereby incorporated by reference herein in its entirety

BACKGROUND

1. Technical Field

The present disclosure relates to a method for operating a display apparatus, and a display apparatus.

2. Related Art

JP-A-9-42993 discloses a signal processing apparatus that, upon detection of a change in a sensor signal, initiates a predetermined period for which acceptance of the sensor signal is prohibited as anti-noise measures.

The signal processing apparatus disclosed in JP-A-9-42993 is unable to take advantage of a change in the sensor signal when the change occurs irrespective of noise in a predetermined period.

SUMMARY

An aspect of a method for operating a display apparatus according to the present disclosure includes detecting a first change in a first sensor signal from a first sensor, performing a first action in response to the detection of the first change, detecting a change in the first sensor signal in a first period that starts in response to the detection of the first change, and not performing an action according to the change in the first sensor signal in the first period, but when a change in the first sensor signal last detected in the first period is a second change different from the first change, performing the second action after the first period ends.

An aspect of a display apparatus according to the present disclosure includes a detection section that detects a change in a first sensor signal from a first sensor and a control section that operates based on a result of the detection performed by the detection section, and the control section performs a first action in response to detection of a first change in the first sensor signal performed by the detection section, does not perform an action according to a change in the first sensor signal in a first period that starts in response to the detection of the first change performed by the detection section, and when a change in the first sensor signal last detected by the detection section in the first period is a second change different from the first change, performs a second action after the first period ends.

BRIEF DESCRIPTION OF THE DRAWINGS

FIG. 14 shows an example of the GUI.
FIG. 15 shows an example of the GUI.

DESCRIPTION OF EXEMPLARY EMBODIMENTS

A. First Embodiment

A1: Display System 1

Figure 1:
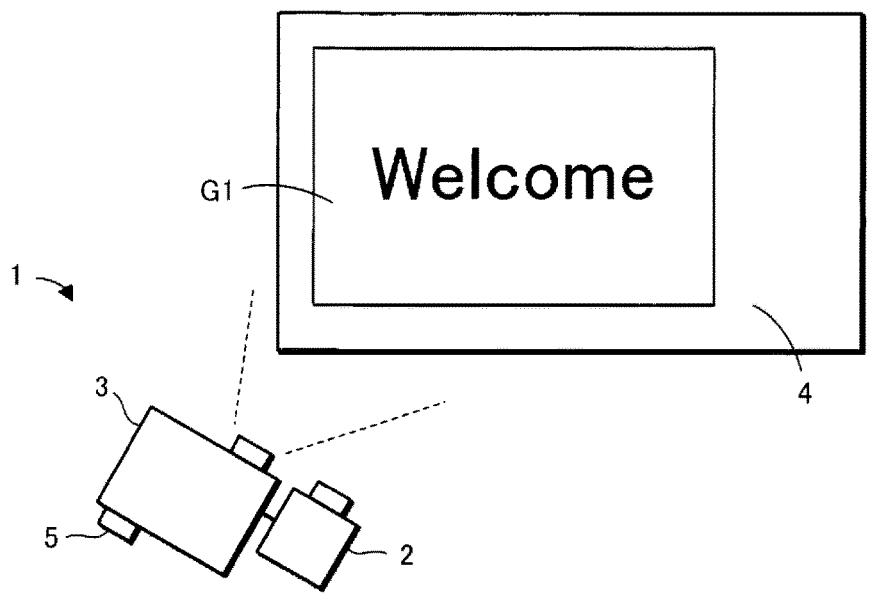
FIG. 1 shows an example of a display system.

FIG. 1 shows an example of a display system 1. The display system 1 displays an image G1. The display system 1 is disposed in an entrance hall. The display system 1 may be installed at a location different from an entrance hall, for example, in a lobby of an event venue. The display system 1 includes a human detecting sensor 2 and a projector 3.

The human detecting sensor 2 detects humans in the entrance hall. The entrance hall is an example of a detection area. The human detecting sensor 2 outputs a first sensor signal a1 expressed in voltage.

The human detecting sensor 2 changes the voltage level of the first sensor signal a1 in accordance with the presence or absence of persons in the entrance hall. The human detecting sensor 2 sets the voltage level of the first sensor signal a1 produced when there is a person in the entrance hall to be higher than the voltage level of the first sensor signal a1 produced when there is no person in the entrance hall. For example, the human detecting sensor 2 sets the voltage level of the first sensor signal a1 at 5 V when there is a person in the entrance hall and sets the voltage level of the first sensor signal a1 at 0 V when there is no person in the entrance hall.

The voltage level of the first sensor signal a1 produced when there is a person in the entrance hall and the voltage level of the first sensor signal a1 produced when there is no person in the entrance hall are not limited to the voltage levels described above. For example, the human detecting sensor 2 may set the voltage level of the first sensor signal a1 produced when there is a person in the entrance hall to be lower than the voltage level of the first sensor signal a1 produced when there is no person in the entrance hall.

The human detecting sensor 2 is an example of a first sensor. The first sensor is not limited to the human detecting sensor 2 and may, for example, be a temperature sensor. The voltage level of the first sensor signal a1 is an example of the level of a first sensor signal.

The projector 3 projects the image G1 onto a display surface 4 by projecting the image G1 onto the display surface 4. The display surface 4 is a wall. The display surface 4 is not limited to a wall and may, for example, be a screen, a whiteboard, a ceiling, a floor, or a door. The image G1 is not limited to the image showing "Welcome" shown in FIG. 1 and can be changed as appropriate. For example, the image G1 may be an image representing a landscape. The image G1 may be a still image or motion images.

A recording medium 5 is coupled to the projector 3. The recording medium 5 is attachable to and detachable from the projector 3. The recording medium 5 is a portable recording medium, for example, an SD (secure digital) card, a micro SD card, or a USB (universal serial bus) memory. The recording medium 5 records image information b1 representing the image G1. For example, the recording medium 5 records the image information b1 provided from an information processing apparatus, such as a smartphone. The recording medium 5 may be built in the projector 3.

The projector 3 reads the image information b1 from the recording medium 5. The projector 3 projects the image G1 based on the image information b1 on the display surface 4. The projector 3 may acquire the image information b1 from a source instrument, such as a PC (personal computer). The projector 3 may select one source instrument from a plurality of source instruments and acquire the image information b1 from the one source instrument.

The projector 3 operates based on the first sensor signal a1 outputted by the human detecting sensor 2. For example, the projector 3 starts projecting the image G1 based on the first sensor signal a1. The projector 3 stops projecting the image G1 based on the first sensor signal a1.

A2: Projector 3

Figure 2:
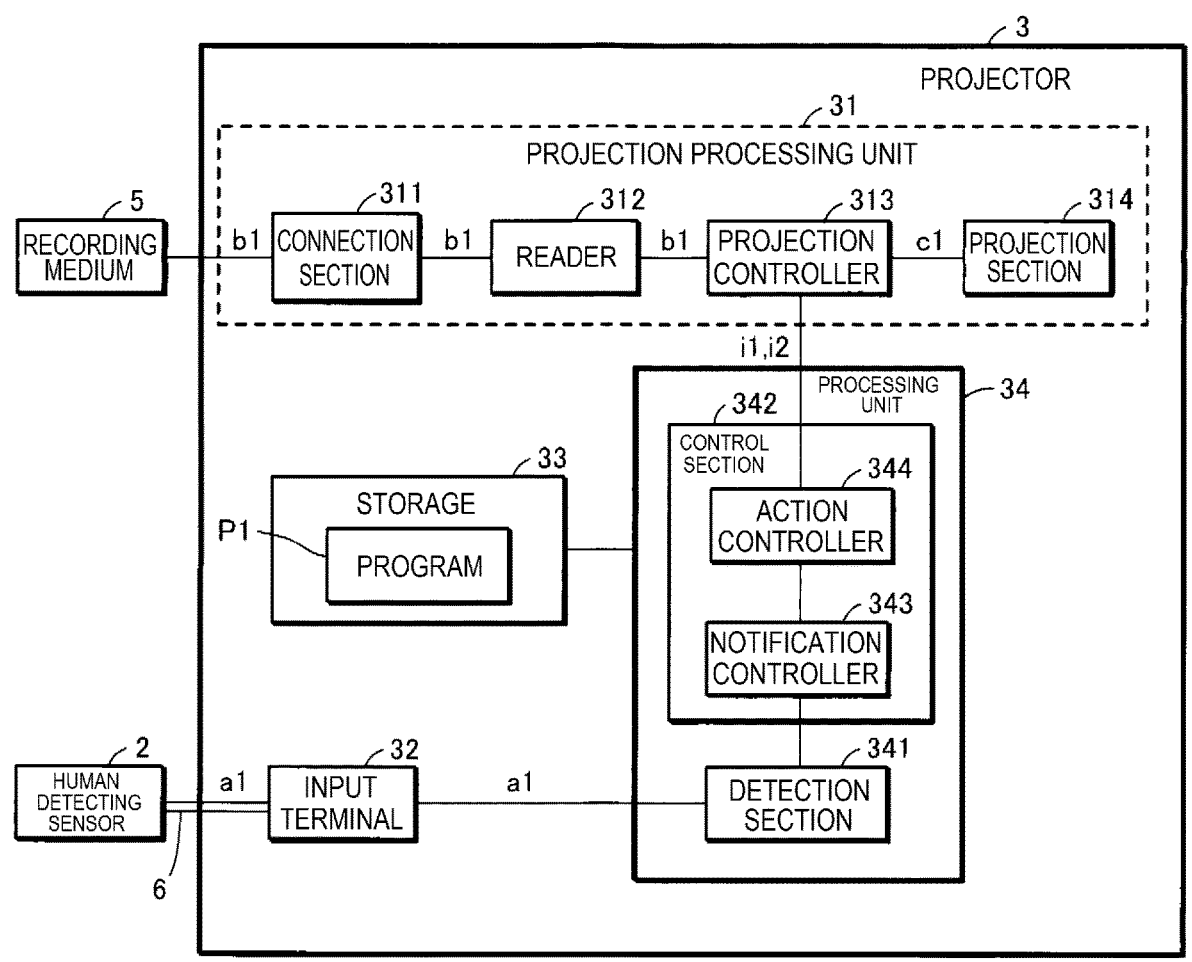
FIG. 2 shows an example of a projector.

FIG. 2 shows an example of the projector 3. The projector 3 includes a projection processing unit 31, an input terminal 32, a storage 33, and a processing unit 34.

The projection processing unit 31 carries out a process relating to the projection of the image G1. The projection processing unit 31 includes a connection section 311, a reader 312, a projection controller 313, and a projection section 314. The connection section 311 is coupled to the recording medium 5. The reader 312 reads the image information b1 from the recording medium 5 via the connection section 311. The reader 312 provides the projection controller 313 with the image information b1. The projection controller 313 generates a drive signal c1 by performing image processing on the image information b1. The image processing includes, for example, gamma correction. The image processing may include processing different from gamma correction, for example, resolution conversion. The projection controller 313 uses the drive signal c1 to control the projection section 314. The projection section 314 projects the image G1 on the display surface 4 based on the drive signal c1.

Figure 3:
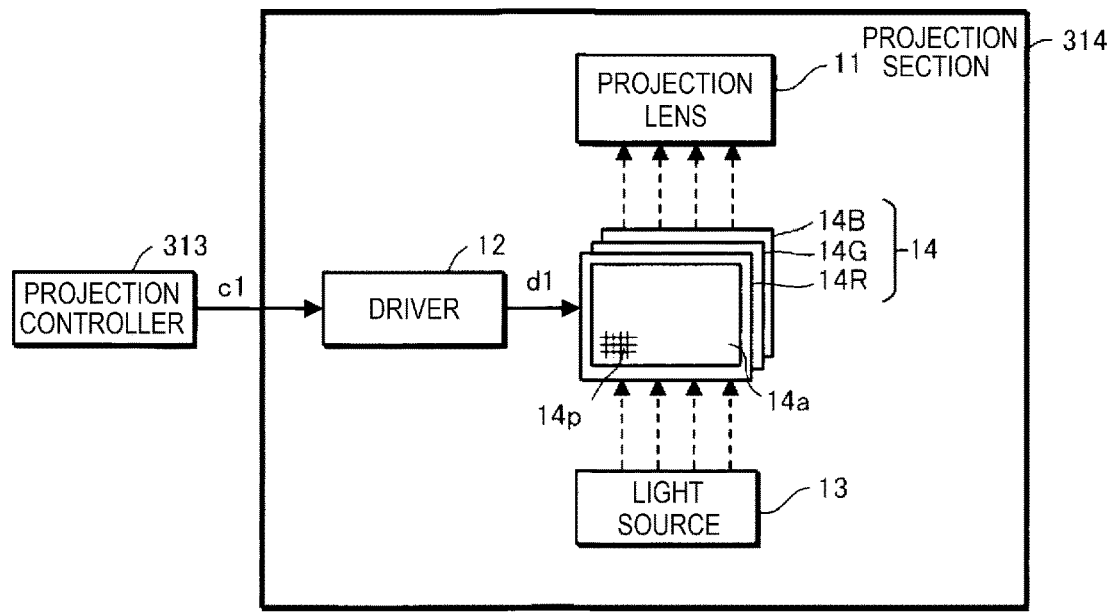
FIG. 3 shows an example of a projection section.

FIG. 3 shows an example of the projection section 314. The projection section 314 includes a projection lens 11, a driver 12, a light source 13, and liquid crystal light valves 14. The liquid crystal light valves 14 include a red liquid crystal light valve 14R, a green liquid crystal light valve 14G, and a blue liquid crystal light valve 14B.

The driver 12 generates a voltage signal dl based on the drive signal c1. The driver 12 drives the liquid crystal light valves 14 by applying the drive voltage dl to the liquid crystal light valves 14.

The light source 13 is an LED (light emitting diode). The light source 13 is not limited to an LED and may, for example, be a xenon lamp, an ultrahigh-pressure mercury lamp, or a laser light source. The light source 13 outputs visible light.

The light outputted from the light source 13 enters an optical integration system that is not shown. The optical integration system reduces variation in the luminance distribution of the light incident thereon.

The liquid crystal light valves 14 each have a rectangular pixel area 14a. The pixel area 14a includes a plurality of pixels 14p arranged in a matrix.

When the driver 12 applies the voltage signal dl to each of the pixels 14p, the optical transmittance of each of the pixels 14p is changed based on the voltage signal dl. The light outputted from the light source 13 is modulated when passing through the pixel areas 14a. The image G1 is thus generated. The image G1 is projected via the projection lens 11.

The description will be resumed with reference to FIG. 2. The input terminal 32 is, for example, a USB connector. The input terminal 32 is not limited to a USB connector and can be changed as appropriate. The input terminal 32 receives the first sensor signal a1 from the human detecting sensor 2 via a cable 6. The input terminal 32 may be referred to as a communication section. The projector 3 may include a wireless communication section capable of wirelessly communicating with the human detecting sensor 2. The wireless communication section wirelessly receives the first sensor signal a1 from the human detecting sensor 2. The wireless communication section provides the processing unit 34 with the first sensor signal a1.

The storage 33 is a recording medium readable by the processing unit 34. The storage 33 includes, for example, a nonvolatile memory and a volatile memory. The nonvolatile memory is, for example, a ROM (read only memory), an EPROM (erasable programmable read only memory), or an EEPROM (electrically erasable programmable read only memory). The volatile memory is, for example, a RAM (random access memory).

The storage 33 stores a program P1 executed by the processing unit 34 and a variety of data used by the processing unit 34.

The processing unit 34 is formed, for example, of one or more CPUs (central processing units). The one or more CPUs are an example of one or more processors. Part or entirety of the functions of the processing unit 34 may be achieved by a circuit, such as a DSP (digital signal processor), an ASIC (application specific integrated circuit), a PLD (programmable logic device), and an FPGA (field programmable gate array). The processing unit 34 reads the program P1 from the storage 33. The processing unit 34 functions as a detection section 341 and a control section 342 by executing the program P1.

The detection section 341 receives the first sensor signal a1 via the input terminal 32. When the projector 3 includes the wireless communication section described above, the detection section 341 may receive the first sensor signal a1 from the wireless communication section in place of the input terminal 32. The detection section 341 detects a change in the first sensor signal a1. The detection section 341 detects a first change e1 in the voltage of the first sensor signal a1 and a second change e2 in the voltage of the first sensor signal a1. The second change e2 differs from the first change e1.

The first change e1 is a change from a voltage lower than 2.0 V to a voltage higher than or equal to 2.0 V. The first change e1 means the change from a level L to a level H of the first sensor signal a1. The first change e1 means that there is a person in the entrance hall, which is the detection area of the human detecting sensor 2.

The second change e2 is a change from a voltage higher than 0.8 V to a voltage lower than or equal to 0.8 V. The second change e2 means the change from the level H to the level L of the first sensor signal a1. The second change e2 means that there is no person in the entrance hall, which is the detection area of the human detecting sensor 2.

The first change e1 is not limited to the change from a voltage lower than 2.0 V to a voltage higher than or equal to 2.0 V, and the second change e2 is not limited to the change from a voltage higher than 0.8 V to a voltage lower than or equal to 0.8 V. For example, the first change e1 may be a change from a voltage higher than 0.8 V to a voltage lower than or equal to 0.8 V, and the second change e2 may be a change from a voltage lower than 2.0 V to a voltage higher than or equal to 2.0 V.

Upon detection of the first change e1, the detection section 341 notifies a notification controller 343 of the first change e1, which is the result of the detection. Upon detection of the second change e2, the detection section 341 notifies the notification controller 343 of the second change e2, which is the result of the detection.

The control section 342 controls the projection processing unit 31 based on the notification of the detection result from the detection section 341. The control section 342 includes the notification controller 343 and an action controller 344. The notification controller 343 controls the timing of the notification of the result of the detection performed by the detection section 341 to the action controller 344. The action controller 344 controls the projection processing unit 31 in accordance with the notification from the notification controller 343.

The control section 342 will next be described in detail. The control section 342 causes the projection processing unit 31 to start projecting the image G1 in response to the detection of the first change e1 performed by the detection section 341. The action that causes the projection processing unit 31 to start projecting the image G1 is an example of a first action k1. The action that causes the projection processing unit 31 to start projecting the image G1 is also an example of an action relating to display of an image based on image information stored in a storage device.

In a first period h1, which starts in response to the detection of the first change e1, the control section 342 does not perform an action according to a change in the first sensor signal a1. The change in the first sensor signal a1 is provided as the result of the detection performed by the detection section 341 to the control section 342.

An example of the action according to a change in the first sensor signal a1 is the action that causes the projection processing unit 31 to stop projecting the image G1. An example of the action according to a change in the first sensor signal a1 is not limited to the action that causes the projection processing unit 31 to stop projecting the image G1 and can be changed as appropriate.

When a change in the first sensor signal a1 last detected by the detection section 341 in the first period h1 is the second change e2, the control section 342 causes the projection processing unit 31 to stop projecting the image G1 after the first period h1 ends. The action that causes the projection processing unit 31 to stop projecting the image G1 is an example of a second action k2. The action that causes the projection processing unit 31 to stop projecting the image G1 is an example of the action relating to display of an image based on image information stored in a storage device.

Figure 4:
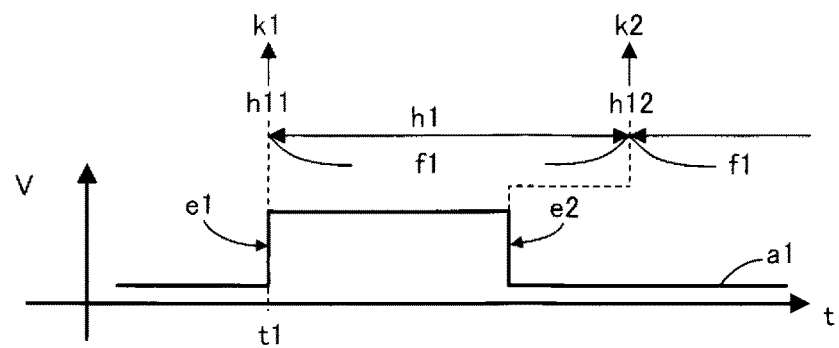
FIG. 4 shows the relationship between a first change notification point of time and a first period.

FIG. 4 shows the relationship between a notification point of time t1, which is the point of time when the notification controller 343 is notified of the first change e1, and the first period h1. In FIG. 4, which shows the first sensor signal a1, the horizontal axis represents time t, and the vertical axis represents voltage V. A start point of time h11 of the first period h1 coincides with the notification point of time t1. An end point of time h12 of the first period h1 is the point of time reached after a first period f1 elapses from the start point of time h11 of the first period h1. The first period f1 is set in accordance with the processing performance of the action controller 344. The lower the processing performance of the action controller 344, the longer the first period f1.

The first period f1 is, for example, 300 ms. The first period f1 is not limited to 300 ms and may be longer than or shorter than 300 ms.

Even when the second change e2 is last detected in the first period h1 as shown in FIG. 4, the control section 342 does not perform the second action k2 according to the second change e2, that is, the action that causes the projection processing unit 31 to stop projecting the image G1 in the first period h1. When the second change e2 is last detected in the first period h1, the control section 342 performs the second action k2 according to the second change e2 after the first period h1 ends.

The configuration described above can suppress a situation in which the control section 342 that performs the second action k2 according to the second change e2 in the first period h1 is overloaded. Furthermore, the control section 342 can take advantage of the second change e2 last detected in the first period h1. The control section 342 does not perform the action according to a change in the first sensor signal a1 until the first period f1 elapses after the control section 342 performs the second action k2.

The first sensor signal a1 may experience the first change e1 caused by noise and the second change e2 caused by noise.

Figure 5:
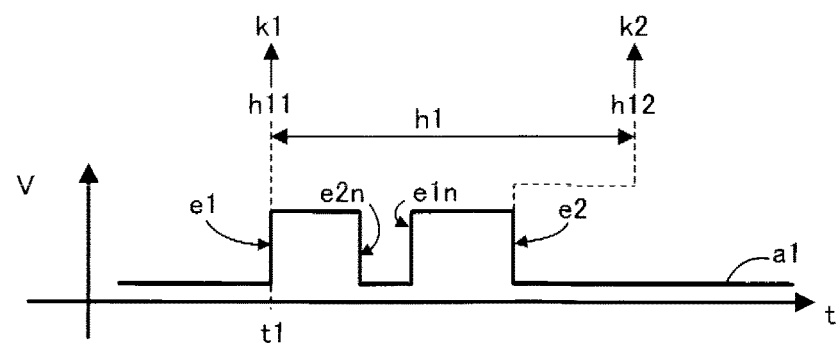
FIG. 5 shows an example of a first sensor signal that changes due to noise.

FIG. 5 shows the first change e1 caused by noise as a first change e1n and the second change e2 caused by noise as a second change e2n in the first sensor signal a1 shown in FIG. 4. In the example shown in FIG. 5, the first change e1n and the second change e2n occur in the period between the point of time when the first change e1 occurs and the point of time when the second change e2 occurs.

When a change in the first sensor signal a1 last detected by the detection section 341 in the first period h1 is the second change e2, the control section 342 causes the projection processing unit 31 to stop projecting the image G1 after the first period h1 ends. That is, when a change in the first sensor signal a1 last detected by the detection section 341 in the first period h1 is the second change e2, the control section 342 ignores the first change e1n and the second change e2n. The control section 342 can therefore take advantage of the second change e2 last detected in the first period h1 without being affected by the first change e1n or the second change e2n shown in FIG. 5.

Figure 6:
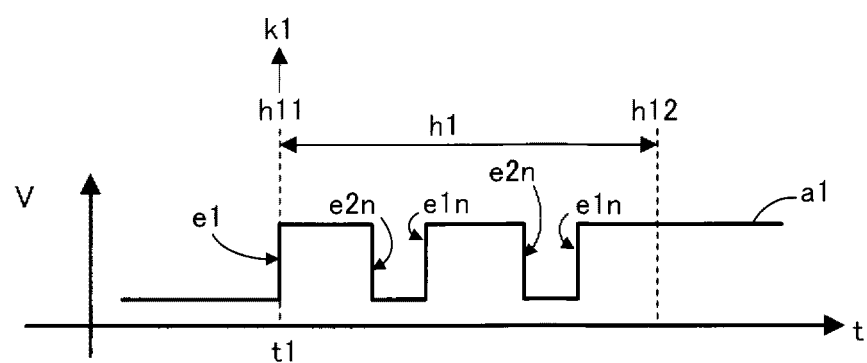
FIG. 6 shows an example of the first sensor signal that changes due to noise.
Figure 7:
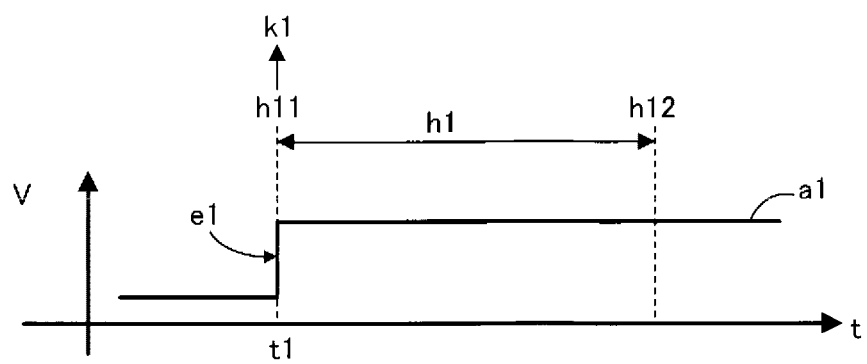
FIG. 7 shows an example of the first sensor signal.

FIG. 6 shows the first change e1 caused by noise as the first change e1n and the second change e2 caused by noise as the second change e2n in the first sensor signal a1 shown in FIG. 7. The first change e1n and the second change e2n are caused, for example, by chattering.

When a change in the first sensor signal a1 last detected in the first period h1 is the first change e1, the last detected first change e1 is likely to be a change caused by noise, as shown in FIG. 6. When a change in the first sensor signal a1 last detected by the detection section 341 in the first period h1 is the first change e1, the control section 342 does not perform the action according to the change in the first sensor signal a1 detected in the first period h1 after the first period h1 ends. The control section 342 is therefore unlikely to be affected by the first change e1n or the second change e2n shown in FIG. 6.

Assume now that the first period h1 is longer than the period required for a person to cross the entrance hall. In this case, even when no noise occurs in the first period h1, the following situation can occur: A plurality of persons cross the entrance hall in the first period h1 cause a change in the first sensor signal a1 last detected in the first period h1 to be the first change e1. In this situation, it is believed that a person is present in the entrance hall at each of the start and end of the first period h1. It is desirable in this situation that the image G1 is continuously displayed even at the end of the first period h1.

When a change in the first sensor signal a1 last detected in the first period h1 is the first change e1, the control section 342 does not perform the action according to the change in the first sensor signal a1 detected in the first period h1 after the first period h1 ends. Therefore, in the situation in which there is a person in the entrance hall at each of the start and end of the first period h1, the image G1 can be continuously displayed even at the end of the first period h1. As described above, when a change in the first sensor signal a1 last detected in the first period h1 is the first change e1, performing an unnecessary action that causes start of the projection of the image G1 again after the first period h1 ends can be restricted.

A3: Action of Projector 3

Figure 8:
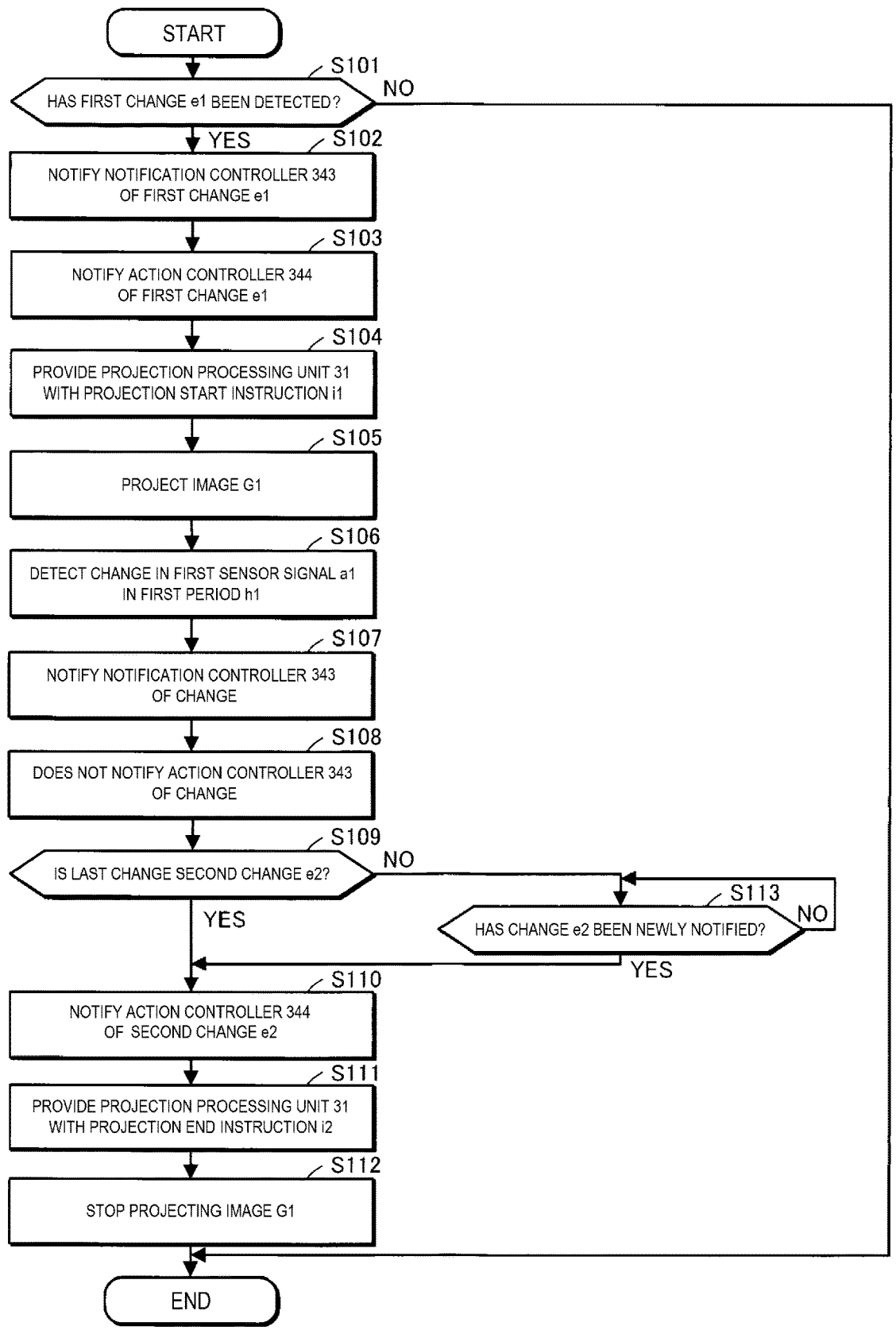
FIG. 8 describes an example of the action of the projector.
Figure 9:
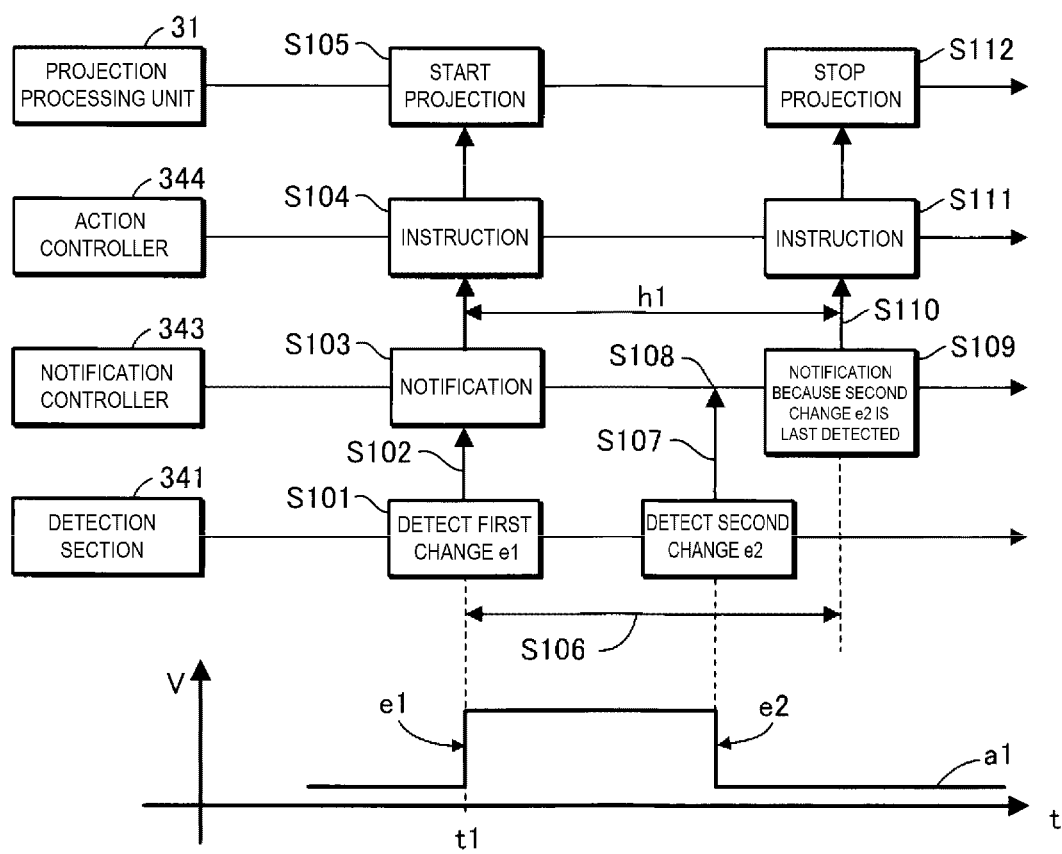
FIG. 9 describes the example of the action of the projector.

FIGS. 8 and 9 describe an example of the action of the projector 3. It is assumed in the following description that the recording medium 5 is coupled to the connection section 311.

When the detection section 341 detects the first change e1, the detection section 341 notifies the notification controller 343 of the first change e1 in step S102 in step S101.

When the notification controller 343 receives the notification of the first change e1 at the notification point of time t1, the notification controller 343 notifies the action controller 344 of the first change e1 in step S103. The action that causes the action controller 344 to be notified of the first change e1 is another example of the first action k1.

When the action controller 344 receives the notification of the first change e1, the action controller 344 provides the projection processing unit 31 with a projection start instruction i1 in step S104. The projection start instruction i1 represents the start of projection.

When the projection processing unit 31 receives the projection start instruction i1, the projection processing unit 31 projects the image G1 onto the display surface 4 in step S105. For example, when the projection processing unit 31 receives the projection start instruction i1, the projection controller 313 of the projection processing unit 31 causes the reader 312 to read the image information b1 from the recording medium 5 via the connection section 311. The projection controller 313 acquires the image information b1 from the reader 312. The projection controller 313 generates the drive signal c1 by performing image processing on the image information b1. The projection controller 313 provides the projection section 314 with the drive signal c1. The projection section 314 projects the image G1 on the display surface 4 based on the drive signal c1.

In step S106, the detection section 341 detects a change in the first sensor signal a1 in the first period h1. It is assumed in the following description that the detection section 341 has detected the second change e2 in the first period h1.

The detection section 341 subsequently notifies the notification controller 343 of the result of the detection of the change in the first sensor signal a1 in step S107.

In step S108, the notification controller 343 does not notify the action controller 344 of the result of the detection performed by the detection section 341 in the first period h1. The action that causes the action controller 344 to be notified of the result of the detection performed by the detection section 341 is another example of the action according to a change in the first sensor signal a1.

In step S109, the notification controller 343 evaluates whether or not the change in the first sensor signal a1 last detected by the detection section 341 in the first period h1 is the second change e2.

When the change in the first sensor signal a1 last detected by the detection section 341 in the first period h1 is the second change e2, the notification controller 343 notifies in step S110 the action controller 344 of the second change e2 when the first period h1 ends.

When the action controller 344 receives the notification of the second change e2, the action controller 344 provides the projection processing unit 31 with a projection end instruction i2 in step S111. The projection end instruction i2 represents the end of projection.

When the projection processing unit 31 receives the projection end instruction i2, the projection processing unit 31 stops projecting the image G1 in step S112.

When the change in the first sensor signal a1 last detected in the first period h1 is the first change e1 in step S109, the notification controller 343 does not notify the action controller 344 of the change notified from the detection section 341 in the first period h1 even after the first period h1 ends but evaluates whether the second change e2 has been newly notified from the detection section 341 after the first period h1 ends in step S113.

When the second change e2 is newly notified from the detection section 341 after the first period h1 ends, steps S110 to S112 are carried out.

A4: Overview of First Embodiment

According to the present embodiment, no action according to a change in the first sensor signal a1 is performed in the first period h1. The thus configured present embodiment prevents the action controller 344 and in turn the projector 3 from being overloaded.

Furthermore, according to the present embodiment, when a change in the first sensor signal a1 last detected in the first period h1 is the second change e2, the second action k2 is performed after the first period h1 ends. Therefore, when a change occurs in the first sensor signal a1 irrespective of noise, the present embodiment can take advantage of the change.

B: Variations

Aspects of variations of the embodiment presented above by way of example will be presented below by way of example. Two or more aspects arbitrarily selected from those presented below by way of example may be combined with each other as appropriate to the extent that the aspects to be combined with each other do not contradict each other.

B1: First Variation

In the first embodiment, the second change e2 may behave in such a way that the level of the first sensor signal a1 transitions from a first level to a second level and then the second level is maintained for a second period. For example, the second change e2 may behave in such a way that the voltage level of the first sensor signal a1 transitions from a voltage level higher than 0.8 V to a voltage level lower than or equal to 0.8 V and then the voltage level lower than or equal to 0.8 V is maintained for 30 seconds. The voltage level higher than 0.8 V is an example of the first level. The voltage level lower than or equal to 0.8 V is an example of the second level. The period of 30 seconds is an example of the second period. The first level, the second level, and the second period can be changed as appropriate.

Even when a person leaves the detection area of the human detecting sensor 2, the person may still be in a position where the person can see the image G1 projected by the projector 3. It is therefore desirable that the projector 3 continues to project the image G1 for a certain period after the human detecting sensor 2 does not detect a person anymore. According to the first variation, the projector 3 can stop projecting the image G1 after no person is present in the detection area of the human detecting sensor 2 and a fixed period, such as 30 seconds, then elapses.

The first change e1 may instead behave in such a way that the level of the first sensor signal a1 transitions from the second level to the first level and then the first level is maintained for a third period.

B2: Second Variation

In the first embodiment and the first variation, the projector 3 may operate based on the output signals from a plurality of sensors.

Figure 10:
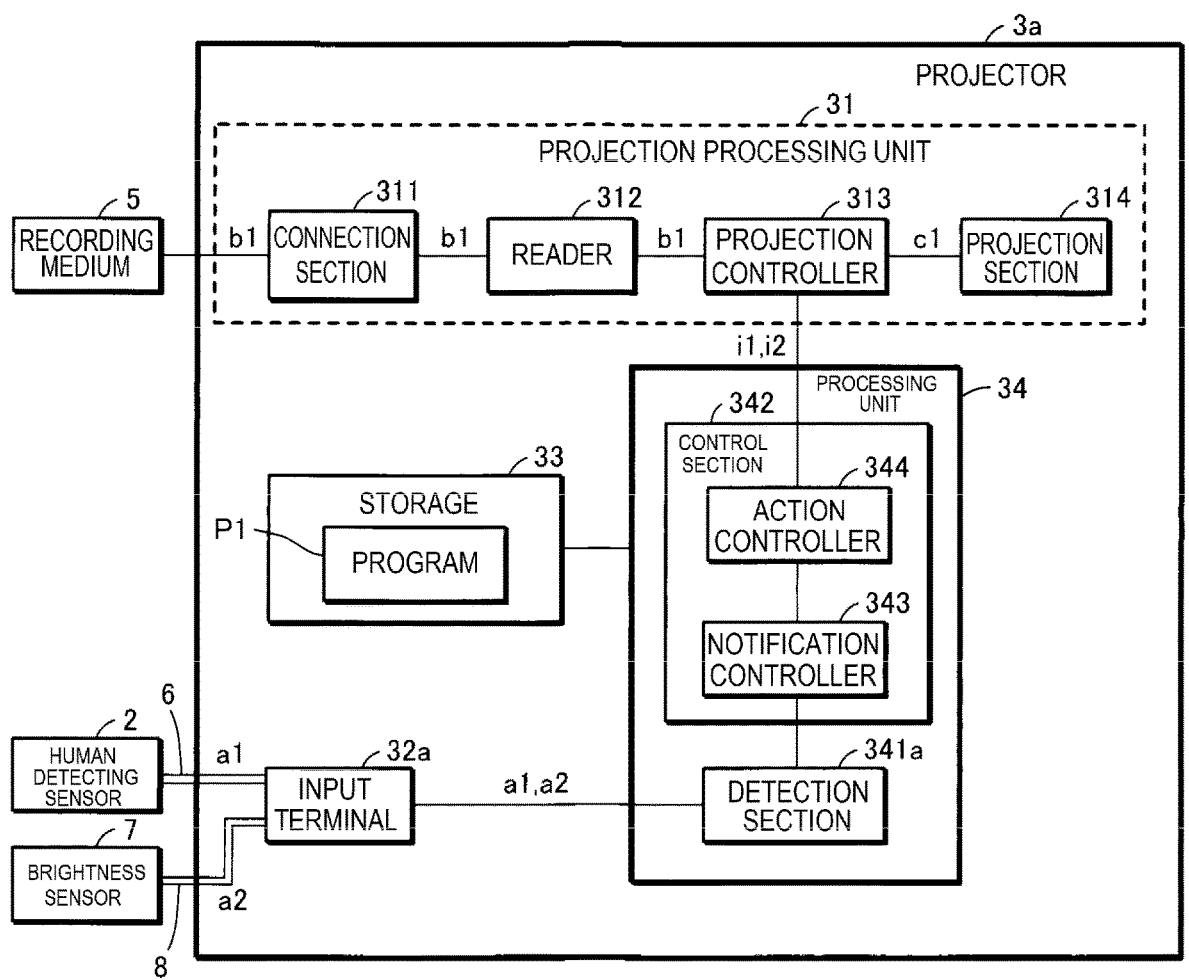
FIG. 10 shows a projector according to a second variation.

FIG. 10 shows a projector 3a according to a second variation. An input terminal 32a of the projector 3a receives the first sensor signal a1 from the human detecting sensor 2 via the cable 6. The input terminal 32a further receives a second sensor signal a2 from a brightness sensor 7 via a cable 8.

The brightness sensor 7 detects the brightness in the entrance hall. The brightness sensor 7 outputs the second sensor signal a2 expressed in voltage. The brightness sensor 7 changes the voltage level of the second sensor signal a2 in accordance with the brightness in the entrance hall. The brightness sensor 7 raises the voltage level of the second sensor signal a2 as the brightness in the entrance hall increases. The brightness sensor 7 may lower the voltage level of the second sensor signal a2 as the brightness in the entrance hall increases.

The voltage level of the second sensor signal a2 is an example of the level of a second sensor signal. The brightness sensor 7 is an example of a second sensor. The second sensor is not limited to the brightness sensor 7 and may, for example, be a sound sensor.

A detection section 341a of the projector 3a differs from the detection section 341 in the following points. The detection section 341a receives the second sensor signal a2 via the input terminal 32a in addition to the first sensor signal a1. The detection section 341a compares the voltage level of the second sensor signal a2 with a threshold level. The threshold level is lower than the voltage level of the second sensor signal a2 produced when the entrance hall is illuminated and higher than the voltage level of the second sensor signal a2 produced when the entrance hall is not illuminated. The level higher than or equal to the threshold level is an example of a third level.

When the voltage level of the second sensor signal a2 is higher than or equal to the threshold level, that is, when the voltage level of the second sensor signal a2 is the level H, the detection section 341a detects the first change e1 and the second change e2 in the voltage of the first sensor signal a1, as the detection section 341 does. When the voltage level of the second sensor signal a2 is lower than the threshold level, that is, when the voltage level of the second sensor signal a2 is the level L, the detection section 341a does not detect the first change e1 or the second change e2 in the voltage of the first sensor signal a1.

The notification controller 343 notifies the action controller 344 of the first change e1 in response to the detection of the first change e1 in the voltage of the first sensor signal a1 in the situation in which the voltage level of the second sensor signal a2 is higher than or equal to the threshold level. When the change in the first sensor signal a1 last detected in the first period h1 is the second change e2 in the situation in which the voltage level of the second sensor signal a2 is higher than or equal to the threshold level, the notification controller 343 notifies the action controller 344 of the second change e2 after the first period h1 ends. The notification controller 343 does not notify the action controller 344 of either the first change e1 or the second change e2 in the situation in which the voltage level of the second sensor signal a2 is lower than the threshold level.

The action controller 344 provides the projection processing unit 31 with the projection start instruction i1 in response to the detection of the first change e1 in the situation in which the voltage level of the second sensor signal a2 is higher than or equal to the threshold level. When the change in the first sensor signal a1 last detected in the first period h1 is the second change e2 in the situation in which the voltage level of the second sensor signal a2 is higher than or equal to the threshold level, the notification controller 343 provides the projection processing unit 31 with the projection end instruction i2 after the first period h1 ends. The action controller 344 does not provide the projection processing unit 31 of either the projection start instruction it or the projection end instruction i2 in the situation in which the voltage level of the second sensor signal a2 is lower than the threshold level.

According to the second variation, the action according to the level of the first sensor signal a1 can be controlled in accordance with the level of the second sensor signal a2.

B3: Third Variation

Figure 11:
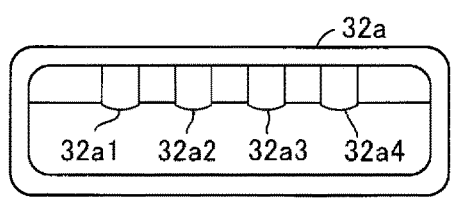
FIG. 11 shows an example of an input terminal.

In the second variation, the input terminal 32a may be a terminal compliant with the type-A USB terminal, as shown in FIG. 11. The input terminal 32a has a first terminal 32a1 to a fourth terminal 32a4. The first terminal 32a1 is a terminal via which a potential of 5 V is supplied. The second terminal 32a2 is a GPI (general purpose input) terminal. The second terminal 32a2 receives the first sensor signal a1. The third terminal 32a3 is a GPI terminal. The third terminal 32a3 receives the second sensor signal a2. The fourth terminal 32a4 is a terminal via which a ground potential of 0 V is supplied. The input terminal 32a shown in FIG. 11 may be used in place of the input terminal 32. According to the third variation, a highly versatile terminal can be used as the input terminal 32 or 32a.

B4: Fourth Variation

In the first embodiment and the first to third variations, a GUI (graphical user interface) that allows a user to set the relationship that associates the first change e1 with the first action k1 may be used.

Figure 12:
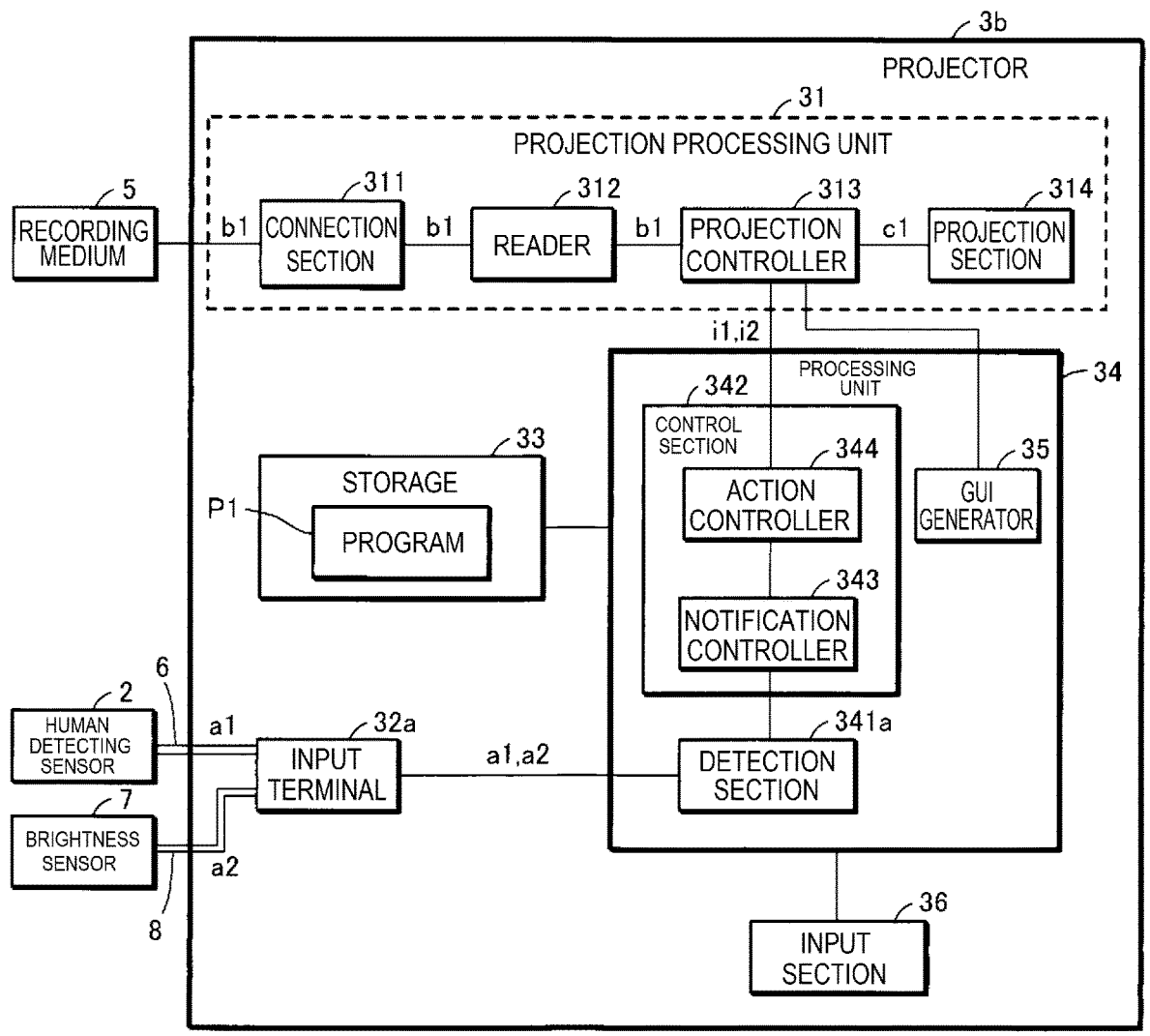
FIG. 12 shows a projector according to a fourth variation.

FIG. 12 shows a projector 3b according to a fourth variation. The projector 3b differs from the projector 3 according to the first embodiment in that the processing unit 34 further functions as a GUI generator 35.

The GUI generator 35 generates GUI information representing a GUI 35a. The GUI generator 35 provides the projection controller 313 with the GUI information to cause the projection processing unit 31 to project the GUI 35a on the display surface 4.

The GUI 35a is a UI (user interface) that associates a third action as the first action k1 with the first change e1 and a fourth action as the second action k2 with the second change e2. The GUI 35a can instead be a UI that sets whether or not the second sensor signal a2 in the third variation is involved and further sets the second time in the first variation in addition to the association operation described above. The GUI 35a may still instead be a UI that only associates the third action as the first action k1 with the first change e1 or a UI that only associates the fourth action as the second action k2 with the second change e2.

Figure 13:
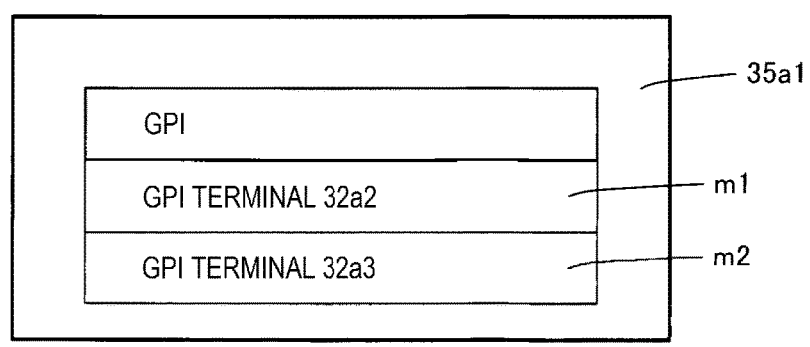
FIG. 13 shows an example of a GUI.

FIGS. 13 to 17 show an example of the GUI 35a. FIG. 13 shows an image 35a1 as the GUI 35a for establishing settings relating to the second terminal 32a2 and the third terminal 32a3 in FIG. 11. The second terminal 32a2 receives, for example, the first sensor signal a1 from the human detecting sensor 2. The third terminal 32a3 receives, for example, the second sensor signal a2 from the brightness sensor 7. The image 35a1 has setting items m1 and m2.

The setting item m1 is an item for setting the action to be associated with a change in the first sensor signal a1. Since the first sensor signal a1 is inputted to the second terminal 32a2, which is a GPI terminal, FIG. 13 shows a "GPI terminal 32a2" as the setting item m1. The setting item m2 is an item for setting the action to be associated with a change in the second sensor signal a2. Since the second sensor signal a2 is inputted to the third terminal 32a3, which is a GPI terminal, FIG. 13 shows a "GPI terminal 32a3" as the setting item m2.

In the image 35a1, when a user operates an input section 36 to select the setting item m1, the GUI generator 35 switches the GUI 35a from the image 35a1 to an image 35a2 shown in FIG. 14. The input section 36 is a touch panel. The input section 36 may instead be operation buttons.

The image 35a2 shows actions associated with changes in the first sensor signal a1. In FIG. 14, the first change e1 in the first sensor signal a1, that is, the change from the level L to the level H in the first sensor signal a1 is associated with the action "image projection". When the image information b1 representing the image G is registered in a playlist stored in the recording medium 5, the "image projection" may be replaced with "playlist reproduction".

The association of the first change e1 with the action is performed by the GUI generator 35. For example, the GUI generator 35 associates the action "image projection" with the first change e1 in accordance with the user's operation performed on the input section 36. As an example, in the image 35a2, when the user operates the input section 36 to select the item m3 in the field L→H, the GUI generator 35 switches the GUI 35a from the image 35a2 to an image 35a3 shown in FIG. 15.

The image 35a3 shows candidates for the action associated with the first change e1, that is, a plurality of candidates for the third action. The plurality of candidates for the third action include "OFF", which means no associated action, POWER ON, POWER OFF, AV (audio visual) MUTING, AV UNMUTING, IMAGE PROJECTION, IMAGE TERMINATION, SOURCE SWITCHING, LIGHT SOURCE MODE [NORMAL], and LIGHT SOURCE MODE [LOW LUMINANCE].

POWER ON is the action that causes the projector 3b to be powered on. POWER OFF is the action that causes the projector 3b to be powered off. AV MUTING is the action that causes the sound outputted from a loudspeaker, if any, of the projector 3b to be muted. AV UNMUTING is the action that causes the sound outputted from a loudspeaker, if any, of the projector 3b to be unmuted.

IMAGE PROJECTION is the action that causes an image to be projected. PLAYLIST REPRODUCTION may be used in place of IMAGE PROJECTION, as described above. PLAYLIST REPRODUCTION is the action that causes a playlist to be reproduced. The playlist to be reproduced is set by operation performed on the input section 36. The playlist to be reproduced is shown in a playlist item r1 shown in FIG. 14. IMAGE TERMINATION is the action that causes the image projection to be terminated. When PLAYLIST REPRODUCTION is used in place of IMAGE PROJECTION, PLAYLIST TERMINATION may be used in place of IMAGE TERMINATION.

SOURCE SWITCHING is the action that causes the source instrument that provides the image information to be switched to another. The switching destination source is set by operation performed on the input section 36. The switching destination source is shown in a source item r2 shown in FIG. 14.

LIGHT SOURCE MODE [NORMAL] is the action that causes the luminance of the light from the light source 13 of the projection section 314 to be adjusted to luminance specified in advance as NORMAL. LIGHT SOURCE MODE [LOW LUMINANCE] is the action that causes the luminance of the light from the light source 13 of the projection section 314 to be adjusted to luminance lower than NORMAL.

The plurality of candidates for the third action are not limited to the actions described above and can be changed as appropriate.

When the user operates the input section 36 to select one candidate from the plurality of candidates for the third action, the GUI generator 35 puts a filled circle at the selected candidate and associates the selected candidate with the first change e1 as the third action. The GUI generator 35 then switches the GUI 35a from the image 35a3 to an image showing the relationship that associates the third action with the first change e1 shown in FIG. 14. The control section 342 performs the third action corresponding to the first change e1 as the first action k1.

In the image 35a2 shown in FIG. 14, also when the user operates the input section 36 to select the item m4 in the H→L field, the GUI generator 35 switches the GUI 35a from the image 35a2 to the image 35a3. The GUI generator 35 then associates the action candidate selected by the user with the second change e2 as a fourth action based on the user's operation performed on the input section 36. The control section 342 performs the fourth action corresponding to the second change e2 as the second action k2.

Figure 16:
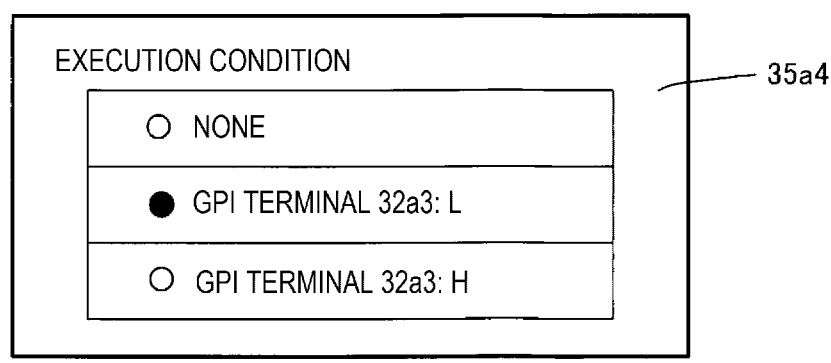
FIG. 16 shows an example of the GUI.

In the image 35a2 shown in FIG. 14, when the user operates the input section 36 to select the item m5, which represents an execution condition, the GUI generator 35 switches the GUI 35a from the image 35a2 to an image 35a4 shown in FIG. 16.

The image 35a4 shows three conditions that allow the action corresponding to the first change e1 to be performed: "None", "Level at third terminal 32a3 is L", and "Level at third terminal 32a3 is H". Since the third terminal 32a3 is a GPI terminal, FIG. 16 shows "Level at third terminal 32a3 is L" as "GPI terminal 32a3: L". Since the third terminal 32a3 is a GPI terminal, FIG. 16 shows "Level at third terminal 32a3 is H" as "GPI terminal 32a3: H". When the action corresponding to the first change e1 is performed irrespective of the level of the third terminal 32a3, as in the first embodiment, the condition indicating "None" is selected by the user's operation performed on a remote control. When the action corresponding to the first change e1 is performed in the situation in which the level at the third terminal 32a3 is the level H, as in the second variation, the condition indicating "Level at third terminal 32a3 is H" is selected by the user's operation performed on the remote control. The GUI generator 35 sets the result of the selection as the execution condition.

Figure 17:
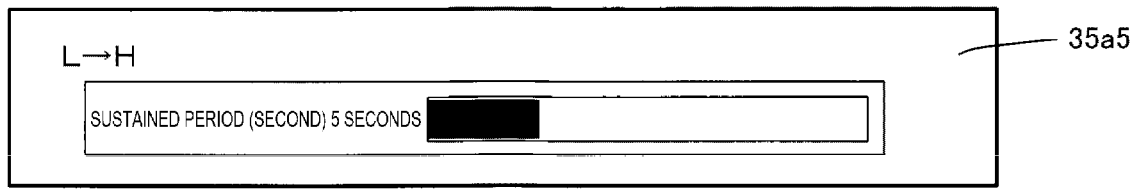
FIG. 17 shows an example of the GUI.

In the image 35a2 shown in FIG. 14, when the user operates the input section 36 to select the item m6, which represents the sustained period, the GUI generator 35 switches the GUI 35a from the image 35a2 to an image 35a5 shown in FIG. 17.

The image 35a5 is used to set the second period in the first variation. The second period is determined by the user's operation performed on the remote control. The GUI generator 35 sets the result of the determination as the second period.

According to the fourth variation, the user can establish a variety of settings by using the GUI 35a. Furthermore, since the projector 3 generates the GUI 35a, the user can establish a variety of settings without using an apparatus different from the projector 3, such as a PC.

B5: Fifth Variation

The liquid crystal light valves 14 are used as an example of a light modulator, and the light modulator is not limited to liquid crystal light valves and can be changed as appropriate. For example, the light modulator may be configured to use, for example, one digital mirror device. In place of a liquid crystal panel or a DMD, a configuration capable of modulating the light outputted from the light source 13 is employable as the light modulator.

B6: Sixth Variation

The projectors 3, 3a, and 3b are used as examples of the display apparatus, and the display apparatus is not limited to a projector and can be changed as appropriate. For example, the display apparatus may be a display having a display surface. A display having a display surface includes a liquid crystal display apparatus and an OLED (organic light emitting diode).

C: Aspects Derived from Embodiment and Variations Described Above

The following aspects are derived from at least one of the embodiment and variations described above.

C1: First Aspect

In a first aspect of the method for operating a display apparatus, a first change in a first sensor signal from a first sensor is detected, and a first action is performed in response to the detection of the first change. In the first aspect of the method for operating a display apparatus, a change in the first sensor signal is further detected in a first period that starts in response to the detection of the first change. In the first aspect of the method for operating a display apparatus, an action according to the change in the first sensor signal is not performed in the first period. In the first aspect of the method for operating a display apparatus, when a change in the first sensor signal last detected in the first period is a second change different from the first change, the second action is performed after the first period ends. According to the first aspect, the display apparatus is not overloaded because the display apparatus does not perform the action according to the change in the first sensor signal in the first period. Furthermore, according to the first aspect, when the change in the first sensor signal last detected in the first period is the second change, the second action is performed after the first period ends. Therefore, when a change occurs in the first sensor signal irrespective of noise, the preset aspect can take advantage of the change.

C2: Second Aspect

In a second aspect of the method for operating a display apparatus, when the change in the first sensor signal last detected in the first period is the first change in the first aspect, an action according to the change in the first sensor signal detected in the first period is not performed after the first period ends. According to the second aspect, unnecessary actions can be restricted after the first period ends.

C3: Third Aspect

In a third aspect of the method for operating a display apparatus, the second change behaves in the first or second aspect in such a way that the level of the first sensor signal transitions from a first level to a second level and the second level is then maintained for a second period. According to the third aspect, the second action can be performed when the level of the first sensor signal transitions from the first level to the second level and the second level is then maintained for the second period in the first period.

C4: Fourth Aspect

In a fourth aspect of the method for operating a display apparatus, the level of a second sensor signal from a second sensor is detected and the first action is performed in response to the detection of the first change in the first sensor signal in a situation in which the level of the second sensor signal is a third level in any of the first to third aspects. Furthermore, in the fourth aspect of the method for operating a display apparatus, when the change in the first sensor signal last detected in the first period is the second change in the situation in which the level of the second sensor signal is the third level, the second operation is performed after the first period ends. According to the fourth aspect, the action according to the change in the first sensor signal can be controlled in accordance with the level of the second sensor signal.

C5: Fifth Aspect

In a fifth aspect of the method for operating a display apparatus, a third action is further associated with the first change based on the user's operation, and the third action corresponding to the first change is performed as the first action in any of the first to fourth aspects. According to the fifth aspect, the user can set the first action.

C6: Sixth Aspect

In a sixth aspect of the method for operating a display apparatus, a fourth action is further associated with the second change based on the user's operation, and the fourth action corresponding to the second change is performed as the second action in any of the first to fifth aspects. According to the sixth aspect, the user can set the second action.

C7: Seventh Aspect

In a seventh aspect of the method for operating a display apparatus, the first or second action is an action relating to display of an image based on image information stored in a storage device in any of the first to sixth aspects. According to the seventh aspect, the action relating to display of an image based on the image information stored in the storage device can be performed in accordance with the first change e1 or the second change e2.

C8: Eighth Aspect

An eighth aspect relating to a display apparatus includes a detection section that detects a change in the first sensor signal from the first sensor and a control section that operates based on the result of the detection performed by the detection section. The control section performs the first action in response to the detection of the first change in the first sensor signal performed by the detection section. The control section does not perform an action according to a change in the first sensor signal in a first period that starts in response to the detection of the first change performed by the detection section. The control section performs the second action after the first period ends when a change in the first sensor signal last detected by the detection section in the first period is the second change different from the first change. According to the eighth aspect, the display apparatus is not overloaded because the display apparatus does not perform the action according to a change in the first sensor signal in the first period. Furthermore, according to the eighth aspect, when the change in the first sensor signal last detected in the first period is the second change, the second action is performed after the first period ends. Therefore, when a change occurs in the first sensor signal irrespective of noise, the present aspect can take advantage of the change.

What is claimed is:

1. A method for operating a display apparatus, the method comprising:
    detecting a first change in a first sensor signal from a first sensor;
    performing a first action in response to the detection of the first change;
    detecting changes in the first sensor signal in a first period that starts in response to the detection of the first change, the first period having a predetermined length;
    maintaining the first action during an entirety of the predetermined length of the first period until the entirety of the predetermined length of the first period has ended, regardless whether a change in the first sensor signal is detected, during the first period and before the entirety of the predetermined length of the first period has ended, that is different from the first change; and
    performing a second action after the first period if a change in the first sensor signal last detected in the first period among the changes in the first sensor signal is different from the first change, wherein
    the second action is performed only after the entirety of the predetermined length of the first period has ended even if the change in the first sensor signal last detected in the first period occurs before the entirety of the predetermined length of the first period has ended.

2. The operation method according to claim 1, wherein the second action is not performed after the first period if the change is the same as the first change.

3. The operation method according to claim 1, wherein the change in the first sensor signal last detected in the first period behaves in such a way that a level of the first sensor signal transitions from a first level to a second level and the second level is then maintained for a second period.

4. The operation method according to claim 1, wherein a level of a second sensor signal from a second sensor is detected,
    the first action is performed in response to the detection of the first change in the first sensor signal in a situation in which the level of the second sensor signal is a third level, and
    when the change in the first sensor signal last detected in the first period is a second change in the situation in which the level of the second sensor signal is the third level, the second operation is performed after the first period.

5. The operation method according to claim 1, wherein a third action is associated with the first change based on a user's operation, and
    the third action corresponding to the first change is performed as the first action.

6. The operation method according to claim 1, wherein a fourth action is associated with a second change based on a user's operation, and
    the fourth action corresponding to the second change is performed as the second action.

7. The operation method according to claim 1, wherein the first or second action is an action relating to display of an image based on image information stored in a storage device.

8. A display apparatus comprising:
    one or more processors programmed to execute:
    detecting a first change in a first sensor signal from a first sensor;
    performing a first action in response to detection of a first change in the first sensor signal;
    detecting changes in the first sensor signal in a first period that starts in response to the detection of the first change, the first period having a predetermined length;
    maintaining the first action during an entirety of the predetermined length of the first period until the entirety of the predetermined length of the first period has ended, regardless whether a change in the first sensor signal is detected, during the first period and before the entirety of the predetermined length of the first period has ended, that is different from the first change; and
    performing a second action after the first period if a change in the first sensor signal last detected in the first period among the changes in the first sensor signal is different from the first change, wherein
    the second action is performed only after the entirety of the predetermined length of the first period has ended even if the change in the first sensor signal last detected in the first period occurs before the entirety of the predetermined length of the first period has ended.

* * * * *